(12) United States Patent
Osman

(10) Patent No.: US 10,317,997 B2
(45) Date of Patent: Jun. 11, 2019

(54) SELECTION OF OPTIMALLY POSITIONED SENSORS IN A GLOVE INTERFACE OBJECT

(71) Applicant: Sony Interactive Entertainment Inc., Tokyo (JP)

(72) Inventor: Steven Osman, San Francisco, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 68 days.

(21) Appl. No.: 15/283,095

(22) Filed: Sep. 30, 2016

(65) Prior Publication Data

US 2017/0262056 A1   Sep. 14, 2017

Related U.S. Application Data

(60) Provisional application No. 62/307,424, filed on Mar. 11, 2016.

(51) Int. Cl.

| G06F 3/01 | (2006.01) |
| A63F 13/25 | (2014.01) |
| A63F 13/213 | (2014.01) |
| A63F 13/327 | (2014.01) |
| G06F 1/16 | (2006.01) |
| G06F 3/03 | (2006.01) |
| A63F 13/211 | (2014.01) |
| A63F 13/24 | (2014.01) |
| A63F 13/5255 | (2014.01) |
| A63F 13/212 | (2014.01) |

(52) U.S. Cl.
CPC ............ G06F 3/014 (2013.01); A63F 13/211 (2014.09); A63F 13/212 (2014.09); A63F 13/213 (2014.09); A63F 13/24 (2014.09); A63F 13/25 (2014.09); A63F 13/327 (2014.09); A63F 13/5255 (2014.09); G06F 1/163 (2013.01); G06F 1/1694 (2013.01); G06F 3/011 (2013.01); G06F 3/012 (2013.01); G06F 3/013 (2013.01); G06F 3/016 (2013.01); G06F 3/017 (2013.01); G06F 3/0304 (2013.01); G06F 3/0325 (2013.01); A63F 2300/8082 (2013.01)

(58) Field of Classification Search
None
See application file for complete search history.

(56) References Cited

U.S. PATENT DOCUMENTS

| 4,414,537 A * | 11/1983 | Grimes | A61B 5/1114 341/20 |
| 5,610,528 A * | 3/1997 | Neely | A61B 5/1071 324/660 |

(Continued)

Primary Examiner — Kent W Chang
Assistant Examiner — Nathaniel P Brittingham
(74) Attorney, Agent, or Firm — Penilla IP, APC

(57) ABSTRACT

A glove for interfacing with a virtual reality scene presented via a head-mounted display (HMD) is provided. The glove includes a plurality of digits associated with the glove, each digit configured to receive a finger of a user of the glove; and, a plurality of sensors, each configured to identify a degree of flexion and being associated with one of a plurality of predefined locations along the plurality of digits, wherein one of the plurality of sensors at each of the predefined locations is selected as an optimal sensor for the respective predefined location.

15 Claims, 12 Drawing Sheets

(56) References Cited

U.S. PATENT DOCUMENTS

| | | | |
|---|---|---|---|
| 6,325,768 B1* | 12/2001 | Williams | A61B 5/1071 600/595 |
| 9,104,271 B1* | 8/2015 | Adams | G06F 3/0426 |
| 2002/0152077 A1* | 10/2002 | Patterson | G06F 3/014 704/271 |
| 2009/0326833 A1* | 12/2009 | Ryhanen | G06F 3/014 702/33 |
| 2010/0259472 A1* | 10/2010 | Radivojevic | G06F 3/014 345/156 |
| 2012/0157263 A1* | 6/2012 | Sivak | G06F 3/014 482/4 |
| 2012/0194550 A1* | 8/2012 | Osterhout | G02B 27/0093 345/633 |
| 2013/0265300 A1* | 10/2013 | Vardi | G06F 1/163 345/419 |
| 2014/0049421 A1* | 2/2014 | Grosinger | G01S 7/412 342/146 |
| 2014/0210489 A1* | 7/2014 | Ivanov | G01D 5/2405 324/658 |
| 2014/0336538 A1* | 11/2014 | Simonsen | A61B 5/6829 600/592 |
| 2014/0337724 A1* | 11/2014 | Tremblay | G06F 3/011 715/701 |
| 2014/0364208 A1* | 12/2014 | Perry | A63F 13/00 463/31 |
| 2015/0309563 A1* | 10/2015 | Connor | G06F 3/011 73/865.4 |
| 2015/0331522 A1* | 11/2015 | McMillen | G06F 1/163 345/174 |
| 2015/0339899 A1* | 11/2015 | Ozaki | G08B 6/00 340/407.1 |
| 2016/0054797 A1* | 2/2016 | Tokubo | G06F 3/012 345/633 |
| 2016/0054798 A1* | 2/2016 | Messinger | G06F 3/012 345/156 |
| 2016/0189534 A1* | 6/2016 | Wang | G08C 17/00 340/870.16 |
| 2016/0259408 A1* | 9/2016 | Messinger | G06F 3/012 |
| 2016/0338644 A1* | 11/2016 | Connor | G06F 3/014 |
| 2016/0342207 A1* | 11/2016 | Beran | G06F 3/014 |
| 2016/0363997 A1* | 12/2016 | Black | G06F 3/014 |
| 2017/0165567 A1* | 6/2017 | Walters | A63F 13/285 |
| 2017/0205880 A1* | 7/2017 | Osman | G06F 3/014 |
| 2017/0262056 A1* | 9/2017 | Osman | G06F 3/014 |
| 2017/0316765 A1* | 11/2017 | Louhivuori | G10H 1/0008 |

* cited by examiner

SELECTION OF OPTIMALLY POSITIONED SENSORS IN A GLOVE INTERFACE OBJECT

CLAIM OF PRIORITY

This application claims priority to U.S. Provisional Application No. 62/307,424, filed Mar. 11, 2016, entitled "Selection of Optimally Positioned Sensors in a Glove Interface Object, the disclosure of which is incorporated by reference herein.

RELATED APPLICATIONS

This application is related to U.S. application Ser. No. 14/517,741, filed Oct. 17, 2014, entitled "Glove Interface Object," and to U.S. application Ser. No. 14/517,733, filed Oct. 17, 2014, entitled "Thumb Controller," and to U.S. application Ser. No. 14/717,915, filed May 20, 2015, entitled "Electromagnet-laden Glove for Haptic Feedback," and to U.S. Provisional Application No. 62/175,279, filed Jun. 14, 2015, entitled "Gloves That Include Haptic Feedback for Use with HMD Systems." The disclosures of these applications are incorporated by reference herein.

BACKGROUND

1. Field of the Invention

The present invention relates to a glove for interfacing with an interactive application, which can be rendered to a head-mounted display (HMD), and associated apparatus and methods.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), Sony Playstation3® (PS3), and Sony Playstation4® (PS4), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide for a glove interface object having a plurality of sensors, and associated methods, apparatus and systems that enable selection of a subset of the sensors that are determined to be optimally positioned, which are activated for input during interactivity using the glove interface object.

In some implementations, a glove for interfacing with a virtual reality scene presented via a head-mounted display (HMD) is provided, including: a plurality of digits associated with the glove, each digit configured to receive a finger of a user of the glove; a plurality of sensors, each configured to identify a degree of flexion and being associated with one of a plurality of predefined locations along the plurality of digits, each predefined location having two or more of the sensors associated therewith, wherein one of the plurality of sensors at each of the predefined locations is selected as an optimal sensor for the respective predefined location.

In some implementations, the predefined locations along the plurality of digits are configured to be respectively positioned approximately over a plurality of joints of the fingers of the user of the glove.

In some implementations, the plurality of joints include distal interphalangeal joints, proximal interphalangeal joints, or metacarpophalangeal joints of the fingers of the user of the glove.

In some implementations, the optimal sensor for the respective predefined location exhibits a greatest degree of flexion amongst the sensors that are associated with the respective predefined location.

In some implementations, the optimal sensors are activated for use during the interfacing with the virtual reality scene, and wherein the sensors that are not optimal sensors are deactivated during the interfacing with the virtual reality scene.

In some implementations, the glove further includes: a controller configured to control the activation or deactivation of the plurality of sensors and determine readings of the sensors when activated.

In some implementations, the controller is configured to receive control data from a computing device that determines when to activate or deactivate specific ones of the plurality of sensors and when to take readings of the sensors.

In some implementations, the controller is positioned at a wrist portion of the glove.

In some implementations, a method for determining optimal sensors on a glove for interfacing with a virtual reality scene presented via a head-mounted display (HMD) is provided, including: establishing communication with the glove, the glove having a plurality of digits, each digit configured to receive a finger of a user of the glove, the glove further having a plurality of sensors, each sensor configured to identify a degree of flexion and being associated with one of a plurality of predefined locations along the plurality of digits, each predefined location having two or more of the sensors associated therewith; obtaining first readings of each of the plurality of sensors; obtaining second readings of each of the plurality of sensors; analyzing the first and second readings of each of the plurality of sensors to identify one of the plurality of sensors at each of the predefined locations as an optimal sensor for the respective predefined location; activating the optimal sensor for each of the predefined locations for the interfacing with the virtual reality scene, wherein the ones of the plurality of sensors that are not identified as optimal sensors are not activated for the interfacing with the virtual reality scene.

In some implementations, the predefined locations along the plurality of digits are configured to be respectively positioned approximately over a plurality of joints of the fingers of the user of the glove.

In some implementations, the plurality of joints include distal interphalangeal joints, proximal interphalangeal joints, or metacarpophalangeal joints of the fingers of the user of the glove.

In some implementations, analyzing the first and second readings of each of the plurality of sensors includes determining a difference between the first and second readings for each sensor, the optimal sensor for a given predefined location exhibiting a greatest difference amongst the sensors that are associated with the given predefined location.

In some implementations, the method further includes: activating the optimal sensors for use during the interfacing with the virtual reality scene, wherein the sensors that are not optimal sensors are deactivated during the interfacing with the virtual reality scene.

In some implementations, the method further includes: before determining the first readings, rendering to the HMD a first message prompting the user to assume a first hand pose; after determining the first readings and before determining the second readings, rendering to the HMD a second message prompting the user to assume a second hand pose.

In some implementations, the first hand pose is an open or neutral hand pose; wherein the second hand pose is a closed or first hand pose.

In some implementations, establishing communication with the glove includes communicating with a controller defined on the glove, the controller configured to control the activation of the plurality of sensors and determine readings of the sensors when activated.

In some implementations, obtaining the first and second readings of each of the plurality of sensors includes sending control data to the controller that determines when to activate specific ones of the plurality of sensors and when to take readings of the sensors, and receiving from the controller the first and second readings of each of the plurality of sensors.

Other aspects of the invention will become apparent from the following detailed description, taken in conjunction with the accompanying drawings, illustrating by way of example the principles of the invention.

BRIEF DESCRIPTION OF THE DRAWINGS

The invention may be better understood by reference to the following description taken in conjunction with the accompanying drawings in which.

DETAILED DESCRIPTION

Figure 1:
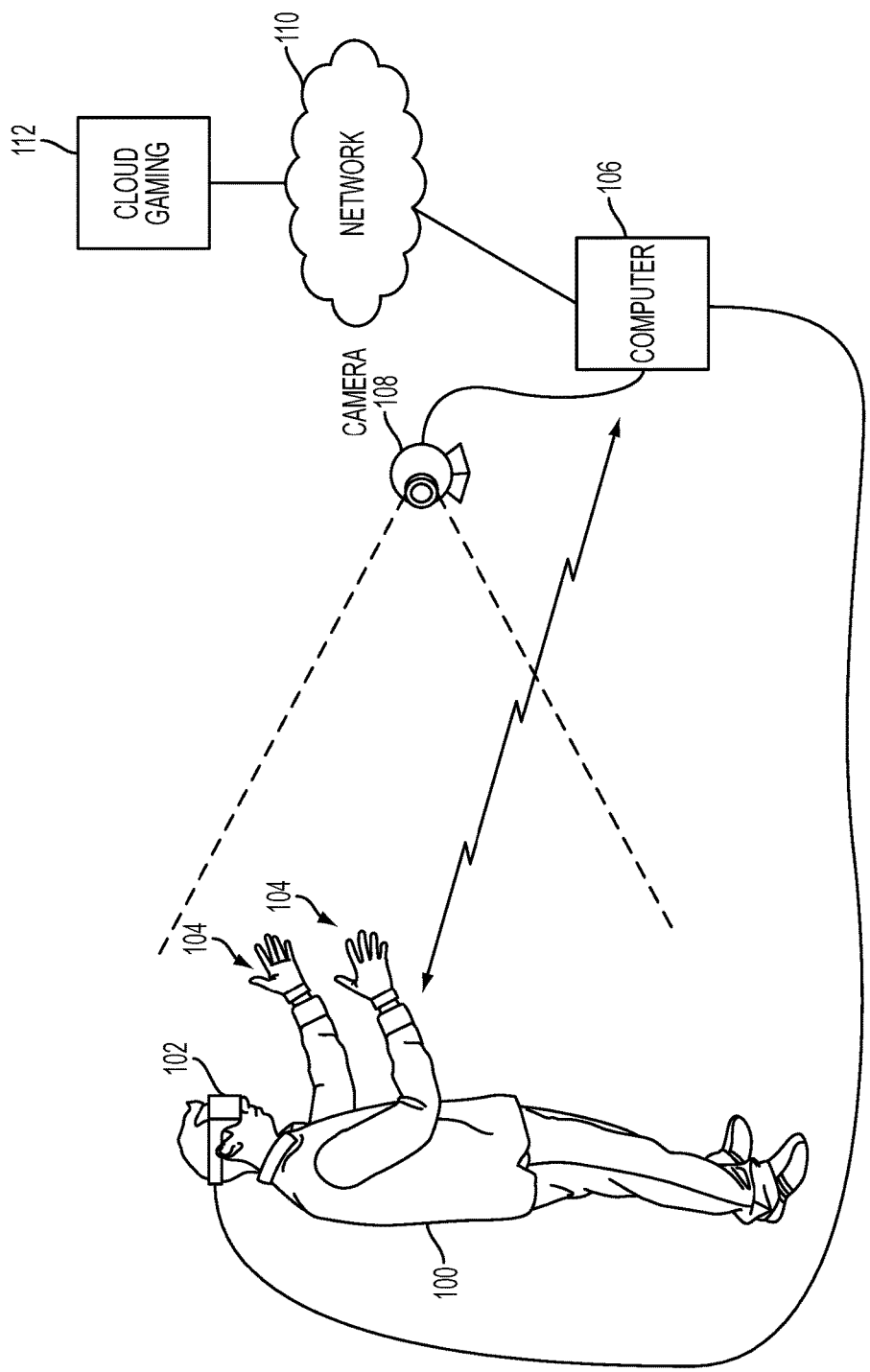
FIG. 1 illustrates a system for interactive gameplay of a video game, in accordance with an embodiment of the invention.

The following embodiments provide a glove interface object and associated systems, methods, and apparatuses.

Implementations of the present disclosure address the problem of creating motion capture gloves that can be optimally utilized with a wide variety of hand sizes and dimensions with a single, one-size-fits-all glove, or a limited number of such gloves.

There are a number of sensors that can be included in a glove to measure the shape of a user's hand. These sensors include inertial sensors, flex sensors and stretch/strain sensors. However, these sensors should be placed optimally to obtain good measurements of the user's hand as it moves during interactivity. For example, when considering flex sensors, an ideal placement of a flex sensor is directly over a joint/knuckle because a flex sensor at such a location will exhibit the most bend as the knuckle bends. This means that depending on the size of the user's hand and the length of their finger segments, the sensors would have to be placed in different locations. Implementations of the disclosure address these issues by providing a glove interface object having multiple redundant sensors in combination with methods to optimize the selection of the sensors. Considerations regarding the minimization of power consumption and maximization of sampling rate are also provided. The sensors discussed herein can be ones that affect resistance, conductance, capacitance or any other measurable signal.

In various implementations, the methods, systems, image capture objects, sensors and associated interfaces objects (e.g., gloves) are configured to process data that is configured to be rendered in substantial real time on a display screen. For example, when a user's hand changes positions (e.g., the hand moves, fingers bend, multiple fingers bend, fingers touch other fingers and/or gestures are made), the changes in positions are configured to be displayed in substantial real time on a display.

The display may be the display of a head mounted display (HMD), a display of a second screen, a display of a portable device, a computer display, a display panel, a display of one or more remotely connected users (e.g., whom may be viewing content or sharing in an interactive experience), or the like. In some embodiments, the captured positions of the user's hand, the pressures sensed, the fingers touched, and/or the hand/finger gestures are used to interact in a video game, in a virtual world scene, a shared virtual space, a video game character, a character that is an extension of the real-world user, or simply provide a way of touching, holding, playing, interfacing or contacting virtual objects shown on a display or objects associated with documents, text, images, and the like.

In still other embodiments, virtual gloves may be worn by multiple users in a multi-user game. In such examples, each user may use one or two gloves. The users may be co-located or interfacing in a shared space or shared game from remote locations using a cloud gaming system, networked device and/or social networked collaboration space. In some embodiments, a glove may be used by one or more remote users to interact in a collaborative way to examine documents, screens, applications, diagrams, business information, or the like. In such an implementation, users collaborating may use their gloves to touch objects, move objects, interface with surfaces, press on objects, squeeze objects, toss objects, make gesture actions or motions, or the like.

During collaboration, movements made by one user's hand can appear to the other user as if a real user hand is moving things, objects, or making actions in the collaboration space. Still in a collaboration environment, if two remote users are examining documents, users wearing gloves can point at things on a virtual page, point and draw on a virtual whiteboard, lift and move virtual papers, shake hands, move items, etc. In some collaborative environments, one or more of the users may be wearing an HMD. When the HMD is used in conjunction with the glove or gloves (e.g., worn by one or more users), the users may see a virtual environment in which they can collaborate using their hands, such as moving objects, pages, objects, typing on virtual keyboards, moving virtual pages, tapping on things, pressing on things, etc.

Therefore, it should be understood that the uses of a glove that includes one or more sensors, and/or can detect pressure, and/or can detect bending position of fingers, and/or can detect orientation, and/or can detect inertial movement, etc., can provide for a broad scope of uses. Example uses, without limitation, may include video gaming, entertainment activities, sport related activities, travel and exploring related activities, human-to-human contact (e.g., shaking hands of a remote user, giving a high-five), business activities, robotic control (e.g. robotic surgery), etc. In one implementation, this type of interactivity provided by a glove interface may be extended to additional sensors that may be attached or associated with other parts of the human body (e.g., an arm, a leg, a foot, etc.). In addition to gloves, different types of clothes are envisioned, e.g., jackets, pants, shoes, hats, etc.

It will be obvious, however, to one skilled in the art, that the present invention may be practiced without some or all of these specific details. In other instances, well known process operations have not been described in detail in order not to unnecessarily obscure the present invention.

FIG. 1 illustrates a system for interactive gameplay of a video game, in accordance with an embodiment of the invention. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture images of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network by the HMD 102, glove interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
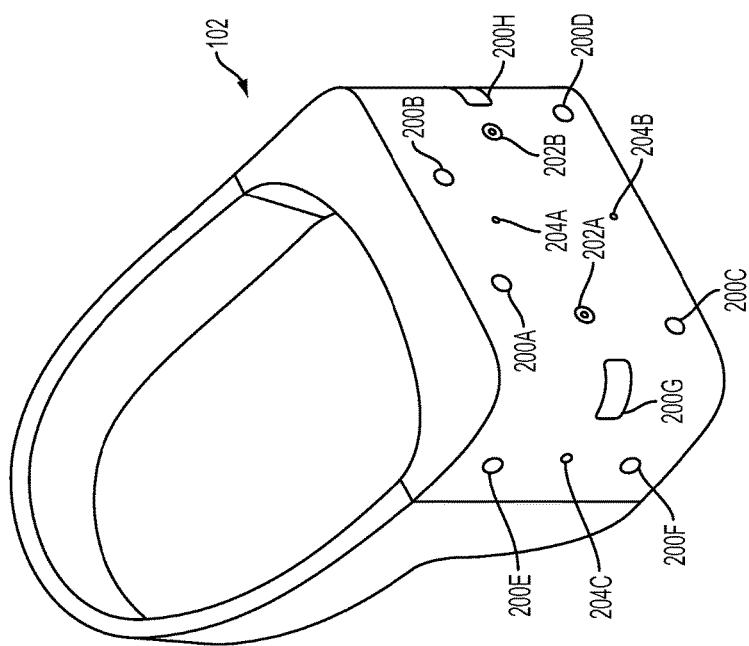
FIG. 2 illustrates a head-mounted display (HMD), in accordance with an embodiment of the invention.

FIG. 2 illustrates a head-mounted display (HMD), in accordance with an embodiment of the invention. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
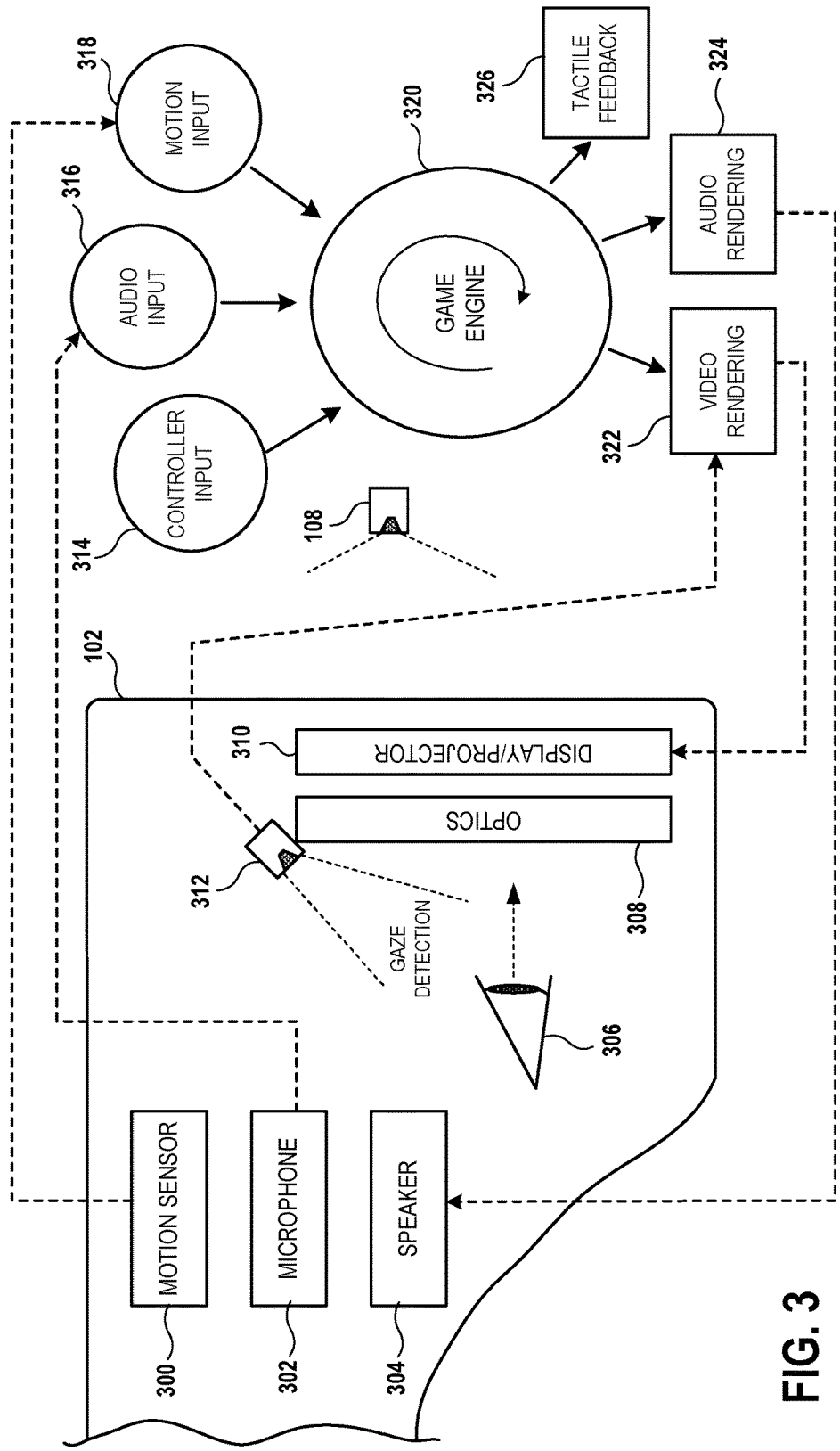
FIG. 3 conceptually illustrates the function of a HMD in conjunction with an executing video game, in accordance with an embodiment of the invention.

FIG. 3 conceptually illustrates the function of the HMD 102 in conjunction with an executing video game, in accordance with an embodiment of the invention. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

As has been noted, the HMD device described herein is capable of providing a user with a highly immersive experience, enveloping a large proportion or even an entirety of a user's field of vision. In light of this immersive aspect of the HMD experience, it is desirable to provide intuitive control mechanisms to the user, especially as the user may not be able to see their own hands or objects (e.g. controller) they are holding. Thus, in accordance with embodiments of the invention described herein, methods, apparatus, and systems are provided for a glove interface object.

Throughout the present disclosure, reference is made to the glove interface object and the user's hand, including the fingers, palm, and other portions thereof. For purposes of ease of description and readability of the present disclosure, it will be understood by those skilled in the art that the glove interface object and the user's hand (and/or portion thereof) may in many instances be referenced interchangeably and/or in the alternative. That is, an activity (e.g. pose, position, movement, orientation, location, action, etc.) defined by a user's hand, also pertains to the glove interface object that is being worn on the user's hand, as the glove interface object is configured to detect or facilitate detection of the activity of the user's hand. Therefore, it may be convenient for descriptive purposes to discuss certain aspects in the present disclosure utilizing language pertaining to the user's hand. However, it will be readily appreciated that the glove interface object is worn on the user's hand and that such may apply or in fact be defined by the glove interface object, this being apparent to those skilled in the art from the context of the description.

Figure 4:
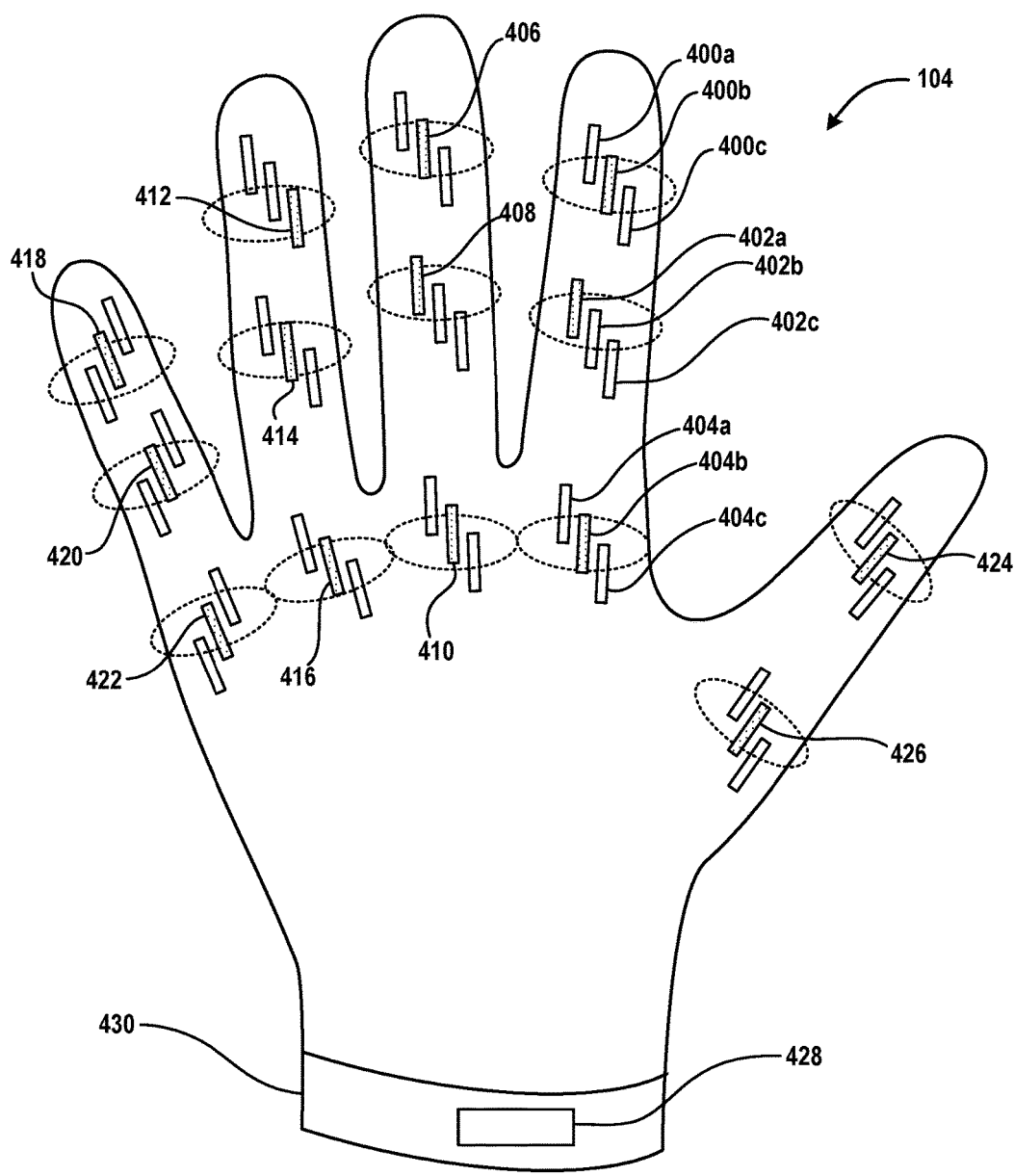
FIG. 4 illustrates a glove interface object having a plurality of sensors positioned so as to be at or near the joints of the user's hand, in accordance with implementations of the disclosure.

FIG. 4 illustrates a glove interface object having a plurality of sensors positioned so as to be at or near the joints of the user's hand, in accordance with implementations of the disclosure. For purposes of describing one particular implementation, the illustrated sensors will be discussed as flex sensors. However, it should be appreciated that in other implementations, the sensors may be other types of sensors, and that similar principles for placement and selection of optimally positioned sensors can be applied to such other implementations.

A flex sensor is configured to detect flexion of a portion of the user's hand such as the user's fingers. In some embodiments, a flex sensor is defined to include a flex sensitive resistor, whose resistance changes based on the amount of flexion of the resistor. Examples of flex sensors are known in the art, and include those manufactured and/or sold by Spectra Symbol, etc. In some implementations, as the flexion of the flex sensitive resistor increases, the resistance of the resistor increases. Each flex sensor can be connected to a single analog input. It will be appreciated that any type of flex sensor that is capable of detecting and/or quantifying flexion may be utilized for purposes of detecting flexion in a glove interface object. Examples of flex sensors and glove interface objects including flex sensors are further described in U.S. application Ser. No. 14/517,741, filed Oct. 17, 2014, entitled "Glove Interface Object," the disclosure of which is incorporated by reference herein.

With continued reference to FIG. 4, a top side of a glove interface object 104 is shown (corresponding to the dorsal side of the hand), including various sensors. The sensors are organized into groups of sensors that are positioned so as to coincide with the expected locations of the joints of the user's hand when wearing the glove interface object 104. By way of example, the group of sensors consisting of sensors 400a, 400b, and 400c, is positioned on the top side of the glove interface object 104 so as to be located at or near the distal interphalangeal joint of the index finger of the user's hand. Likewise, the group of sensors consisting of sensors 402a, 402b, and 402c, is positioned so as to be located at or near the proximal interphalangeal joint of the index finger; and the group of sensors consisting of sensors 402a, 402b, and 402c, is positioned so as to be located at or near the metacarpophalangeal joint of the index finger. Similar groups of sensors are defined and positioned on the glove interface object for the other joints of the user's hand.

In the illustrated implementation, the actual locations of the joints of the user's hand are indicated as shown. These locations define optimal placement regions for the various sensors which are defined in the glove. In implementations wherein the sensors are flex sensors, then the optimally positioned flex sensor for a given joint will be the one that is most directly centered over the joint location, so as to maximally overlap the joint location. A flex sensor so positioned will exhibit the maximum amount of flex when the joint is bent, thereby providing greater variance or range in sensor readings so that more accurate positioning of the user's finger can be determined.

As shown, from the group of sensors 400a/b/c, the sensor 400b exhibits the most overlap with, and is most centered over, the distal interphalangeal joint location, and is therefore the most optimally positioned sensor in the group to measure the flexion of the distal interphalangeal joint of the user's index finger. In a similar manner, from the group of sensors 402a/b/c, the sensor 402a is the most optimally positioned to measure the flexion of the proximal interphalangeal joint of the user's index finger; and from the group of sensors 404a/b/c, the sensor 404b is the most optimally positioned to measure the flexion of the metacarpophalangeal joint of the user's index finger.

As shown in the illustrated implementation, additional sensors which are most optimally positioned amongst their respective sensor groups include the following: sensors 406, 408, and 410 for detecting flexion of the distal interphalangeal joint, proximal interphalangeal joint, and metacarpophalangeal joint, respectively of the user's middle finger; sensors 412, 414, and 416 for detecting flexion of the distal interphalangeal joint, proximal interphalangeal joint, and metacarpophalangeal joint, respectively, of the user's ring finger; sensors 418, 420, and 422 for detecting flexion of the distal interphalangeal joint, proximal interphalangeal joint, and metacarpophalangeal joint, respectively, of the user's little/pinky finger; sensors 424 and 426 for detecting flexion of the interphalangeal joint and metacarpophalangeal joint, respectively, of the user's thumb.

The glove interface object 104 includes a controller 428 that is configured to control the activation/deactivation of the sensors and determine readings of the sensors when activated. The controller 414 may be configured to receive control data from an external device (e.g. gaming console) that determines when to activate/deactivate specific ones of the sensors and/or take readings of the sensors. In some implementations, the controller 428 may be defined at/on a bracelet or wrist portion 430 that is defined as part of the glove interface object 104. However, it should be appreciated that in other implementations, the controller 428 may be defined at any other location on the glove interface object 104 (e.g. on the dorsal side of the palm portion).

It will be appreciated that once the optimally positioned sensors are determined, these sensors can be activated for use during interactive use of the glove interface object 104, while the remaining sensors are deactivated (e.g. to conserve power and/or reduce the amount of data processing required). Thus, by way of example in the presently described implementation, for each joint of the user's hand, one sensor is determined to be the optimally positioned sensor for that joint, and so is activated by the controller for use. An activated sensor is one that is enabled to be read (e.g. supplied with power), and/or is one from which readings are obtained and utilized for interactive input to an interactive program such as a video game. A deactivated sensor is one that is not enabled to be read (e.g. not supplied with power), and/or is one from which readings are not obtained or are ignored.

A calibration/set-up method is employed to determine which sensors are the optimal ones to use. Logic for sensor selection can be configured to perform such a method and may be defined at the glove interface object 104 (e.g. included in the controller 428) or may be defined at an external device that is in communication with the glove interface object, such as a game console, computer, HMD, or other computing device.

Figure 5:
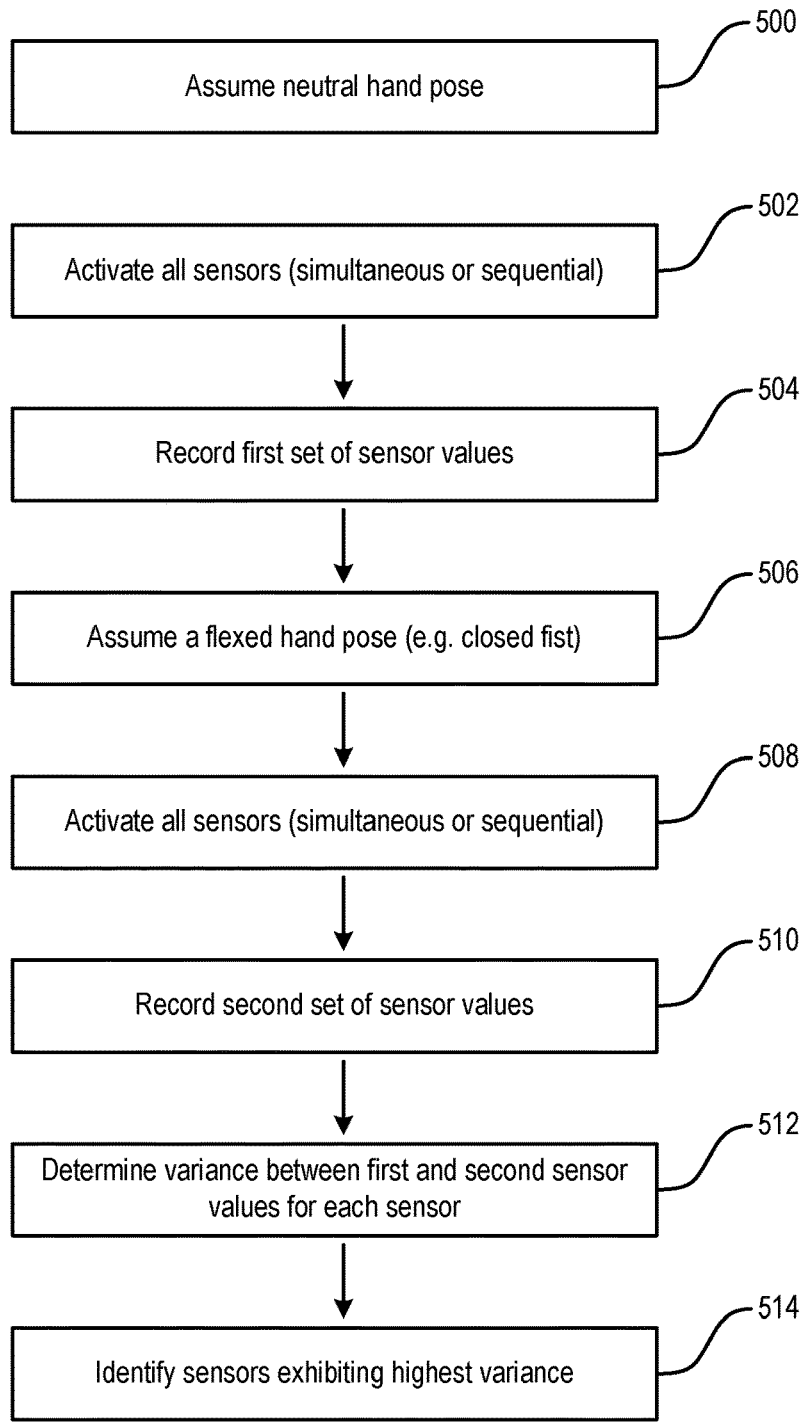
FIG. 5 illustrates a method for selection of optimally positioned sensors in a glove interface object, in accordance with implementations of the disclosure.

With reference to FIG. 5, a sensor selection method is shown, in accordance with implementations of the disclosure. At method operation 500, the user assumes a neutral or open hand pose hand pose. At method operation 502, all of the sensors are activated to enable them to be read. The activation can be simultaneous for all or some of the sensors (e.g. groups of sensors may be sequentially activated) or the activation can be individual (e.g. sequential activation of each individual sensor). At method operation 504, first sensor values or readings are obtained from the activated sensors and recorded.

At method operation 506, the user assumes a flexed or closed hand pose. A tight first may be preferable as it maximally bends the most joints simultaneously. At method operation 508, all of the sensors are again activated to enable them to be read. At method operation 510, second sensor values or readings are obtained from the activated sensors and recorded.

At method operation 512, for each sensor, the difference or variance/range between the sensor's first recorded value and second recorded value is determined. At method operation 514, the sensors exhibiting the greatest difference or variance are identified. These sensors are identified and can be activated and/or designated for use during interactivity with the glove interface object. The remaining sensors can be deactivated or ignored during interactivity.

Figure 6:
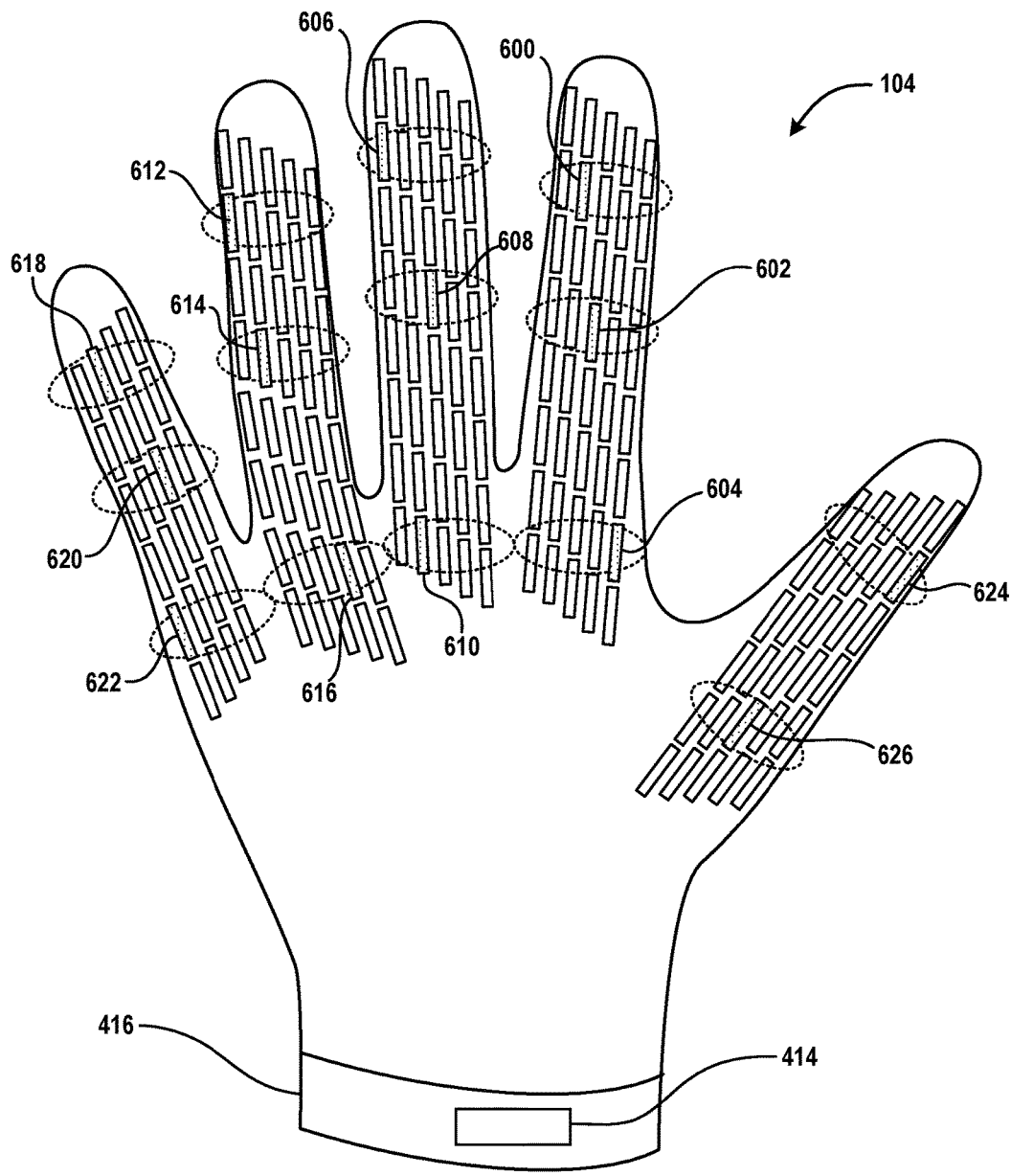
FIG. 6 illustrates a top side of a glove interface object having a plurality of sensors distributed throughout the lengths of the finger portions (digits) of the glove, in accordance with implementations of the disclosure.

Though in the implementation of FIG. 4, specific groups of sensors corresponding to various joints of the hand were described, it will be appreciated that other implementations, sensors can be placed at any location throughout the glove interface object. FIG. 6 illustrates a top side of a glove interface object having a plurality of sensors distributed throughout the lengths of the finger portions (digits) of the glove, in accordance with implementations of the disclosure. As shown at FIG. 6, the sensors are arranged in a continuous pattern extending along substantially the length of each digit. The joint locations are also shown, and the optimally positioned sensors, which can be determined based on variance in sensor values taken from open and closed hand configurations, are indicated as well.

The sensors 600, 606, 612, and 618 are the optimally positioned sensors for the distal interphalangeal joints of the index, middle, ring, and pinky/little fingers, respectively. The sensors 602, 608, 614, and 620 are the optimally positioned sensors for the proximal interphalangeal joints of the index, middle, ring, and pinky/little fingers, respectively. The sensors 604, 610, 616, and 622 are the optimally positioned sensors for the metacarpophalangeal joints of the index, middle, ring, and pinky/little fingers, respectively. The sensors 624 and 626 are the optimally positioned sensors for the interphalangeal and metacarpophalangeal joints of the thumb, respectively.

It will be appreciated that without knowing the actual positions of a user's joints, it will be expected that those flex sensors which are positioned over the user's joints will exhibit the greatest variance between open and closed hand sensor readings. Thus, since the locations of the sensors on the glove can be known, the actual locations of the user's joints can be readily determined using the presently described glove configuration and sensor selection method. Further, the dimensions of the user's hand can be determined from the locations of the joints on the user's hand. In some implementations, this can be utilized to generate a scale accurate model of the user's hand indicating the pose of the user's hand, including the location/positioning of the joints of the user's hand. It will be appreciated that the model can be updated using readings from the optimally positioned sensors.

Though implementations have been described in which the optimally positioned sensors are located at the joints of the user's hand, it will be appreciated that in other implementations, the optimally positioned sensors may be determined to be those sensors positioned at locations that do not exhibit bending or flexion, such as along the phalanges (distal, middle, or proximal) or along the back of the palm (along the metacarpal bone regions).

In some implementations, data from one type of sensor can be utilized to determine optimally positioned sensors of a different type. For example, in one implementation, flex sensors can be activated and read to identify the locations of the joints of the user's hand, as described above. Then, optimally positioned sensors of another sensor type can be identified based on the identified locations of the joints. For example, a subset of inertial sensors or another sensor type that are optimally positioned at non-joint locations may be identified based on the identified joint locations.

While sensors have been shown and described on the top side of the glove interface object, in some implementations, sensors can be provided on the bottom side of the glove interface object (corresponding to the palmar side of the user's hand).

Figure 7:
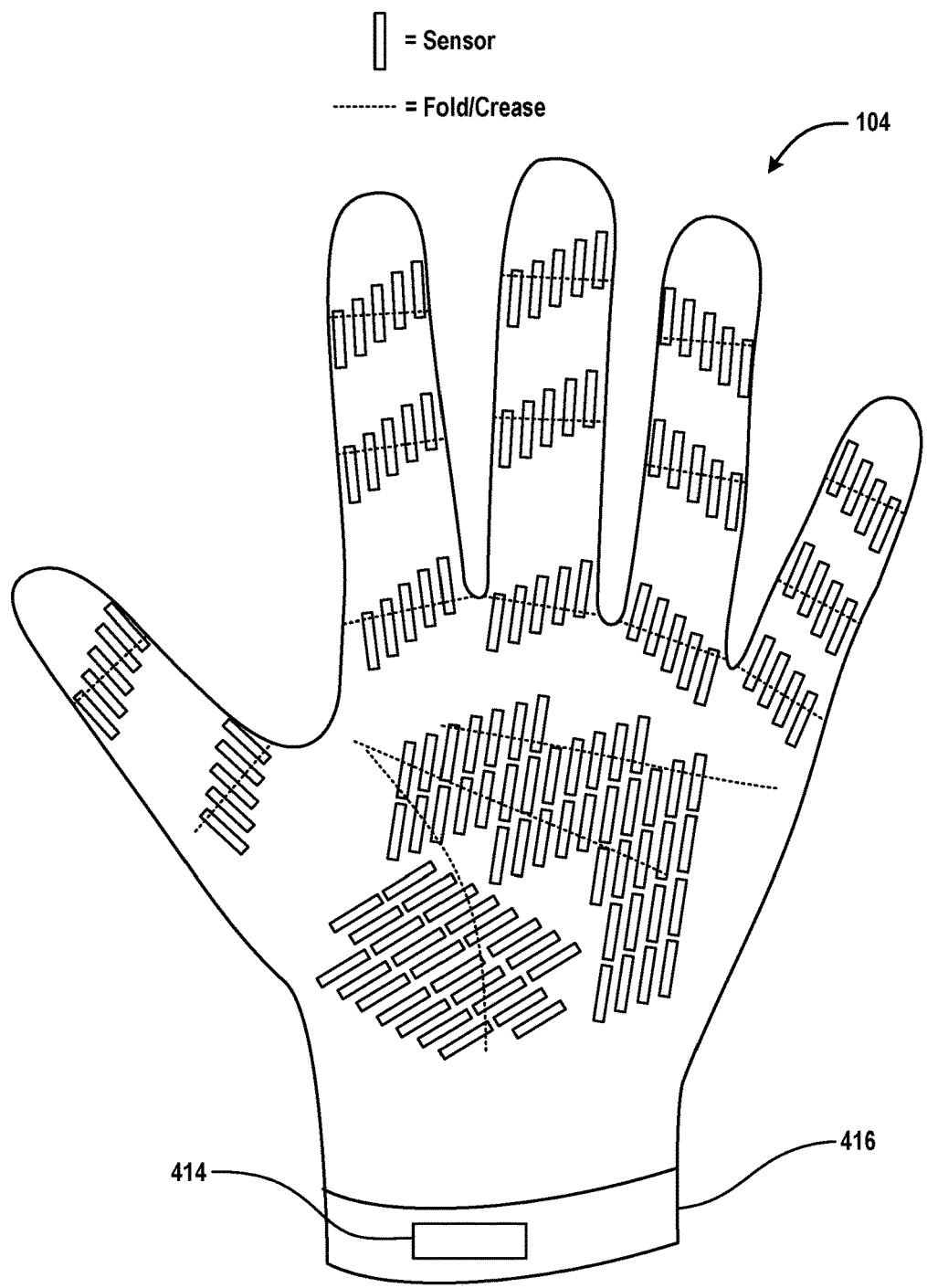
FIG. 7 illustrates a glove interface object having various sensors positioned on the bottom side of the glove, in accordance with implementations of the disclosure.

FIG. 7 illustrates a glove interface object having various sensors positioned on the bottom side of the glove, in accordance with implementations of the disclosure. In particular, several groups of sensors are shown, which are positioned to detect folding or bending along the bottom side of the glove interface object 104. In some implementations, there may be folds or creases, as indicated by the dashed lines, and sensors positioned over these folds or creases can be expected to exhibit greater bending than sensors positioned at other locations. As with implementations discussed above with respect to sensors on the top side of the glove interface object, a method can be performed to determine the optimally positioned sensors in which sensor readings taken during open and closed hand configurations are compared, and sensors exhibiting the highest variance between the open and closed hand readings are identified as the optimally positioned sensors. The optimally positioned sensors are activated for use during interactivity with the glove interface object, whereas the other sensors are deactivated.

In some implementations, a device can be configurable to select groups of sensors at once and read them.

Figure 8:
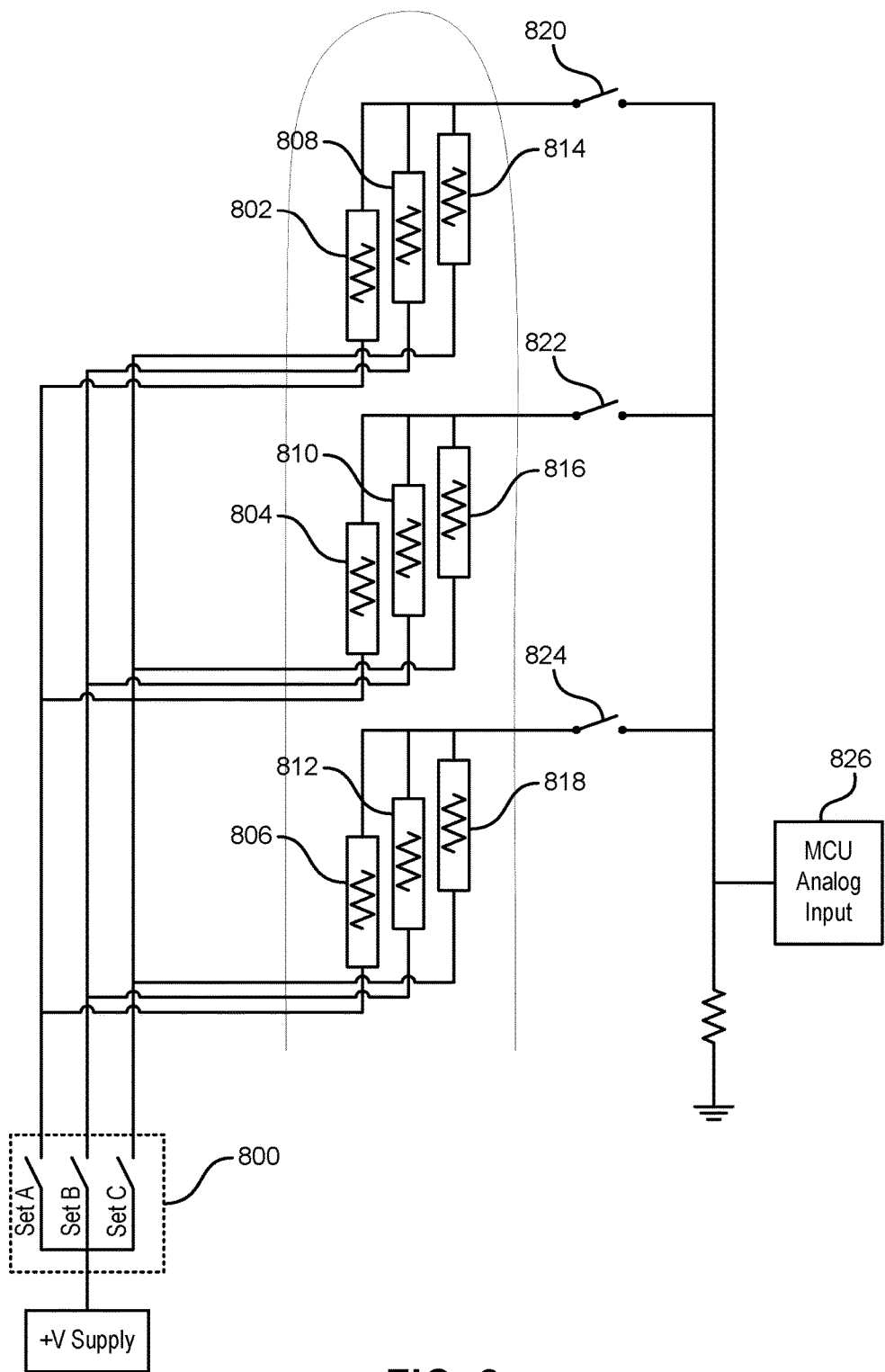
FIG. 8 schematically illustrates a configuration for a finger portion (digit) of a glove interface object having sets of mutually exclusive sensors, in accordance with implementations of the disclosure.

FIG. 8 schematically illustrates a configuration for a finger portion (digit) of a glove interface object having sets of mutually exclusive sensors, in accordance with implementations of the disclosure.

A set of switches 800 are configured to enable selection of one of three sets of sensors to be active (Set A, including sensors 802, 804, and 806; Set B, including sensors 808, 810, and 812; or Set C, including sensors 814, 816, and 818). The switches for selection of the set of sensors can be either a physical switch that the user flips or an electrically controlled switch such as a relay or a transistor. In some implementations, the three sets of sensors are placed in a configuration that matches three typical joint locations for a given glove size. For a selected set of sensors, three sensors receive voltage, and then a downstream set of switches 820, 822, and 824, (typically a transistor or relay that is electrically triggered) would select which of the three sensors are sampled by a single analog input on a microcontroller (MCU) 826.

By way of example, consider a scenario wherein the set of switches 800 are operated so as to activate the Set A sensors for reading. Then, closure of the switch 820 would trigger reading of the sensor 802, which may be positioned at or near a first joint of the user's finger. Closure of the switch 822 would trigger reading of the sensor 804, which may be positioned at or near a second joint of the user's finger. And closure of the switch 824 would trigger reading of the sensor 806, which may be positioned at or near a third joint of the user's finger. Thus, the switches 820, 822, and 824 may function as joint selectors, that is, selecting the joint of the finger for which a sensor reading will be taken. The closure of the switches 820, 822, and 824 can be repeated in a cyclical fashion to provide for continual sensor readings of the Set A sensors.

The calibration process discussed above to determine which sensors to use can be modified for the presently described implementation, so that sensor readings are obtained from each of the sensor Sets A, B and C, during both the open and closed hand configurations. Then the system would determine and report the best selection for future use of the glove interface object.

It will be appreciated that in related implementations, the sets of sensors can be overlapping (i.e. one of the sensors may belong to multiple sets) through the use of diodes that are disposed after the set selection switches.

In some implementations, the system could operate a scanning mode that continuously scans the sensors and looks for one or more specific gestures that are predefined to indicate an attempt at performing calibration of the glove. By way of example, the gestures could be an open hand for a minimum predefined duration (e.g. one second) followed by a first for a minimum predefined duration (e.g. one second). During the continuous scanning phase the values of all sensors will vary wildly as the user places the gloves on their hand. However the gesture of a substantially steady open hand with low input values followed by a closed hand with high input values (e.g. three of them per index/middle/ring/pinky finger) can be detected by logic implementing either a rule-based or a machine learning-based method.

In other implementations, the user can be prompted to assume specific hand poses, such as a neutral or open hand pose, or a closed hand pose (e.g. fist), to facilitate the sensor selection process. For example, the user may be prompted by display of a message on an HMD that is worn by the user (or other display type) to assume an open hand pose, and sensor values may be read. Then the user may be prompted by display of a message to assume a closed hand pose, and sensor values are again read. The sensor readings from corresponding to the two different hand poses can be compared to determine the optimal sensors on the glove to activate and use for interactivity.

Implementations in accordance with the present disclosure provide advantages by maximizing bandwidth and minimizing power consumption. Because it can require power to sample sensors, by reducing the selection of sensors to an identified set of optimal ones, power can be conserved. Similarly, using switches to activate individual sensors can help reduce the number of inputs an MCU requires. Limiting the set of sensors read also enables the update rate of the whole glove to be maximized since sub-optimal or unnecessary sensors are not included in the sensor reading cycles.

Figure 9A:
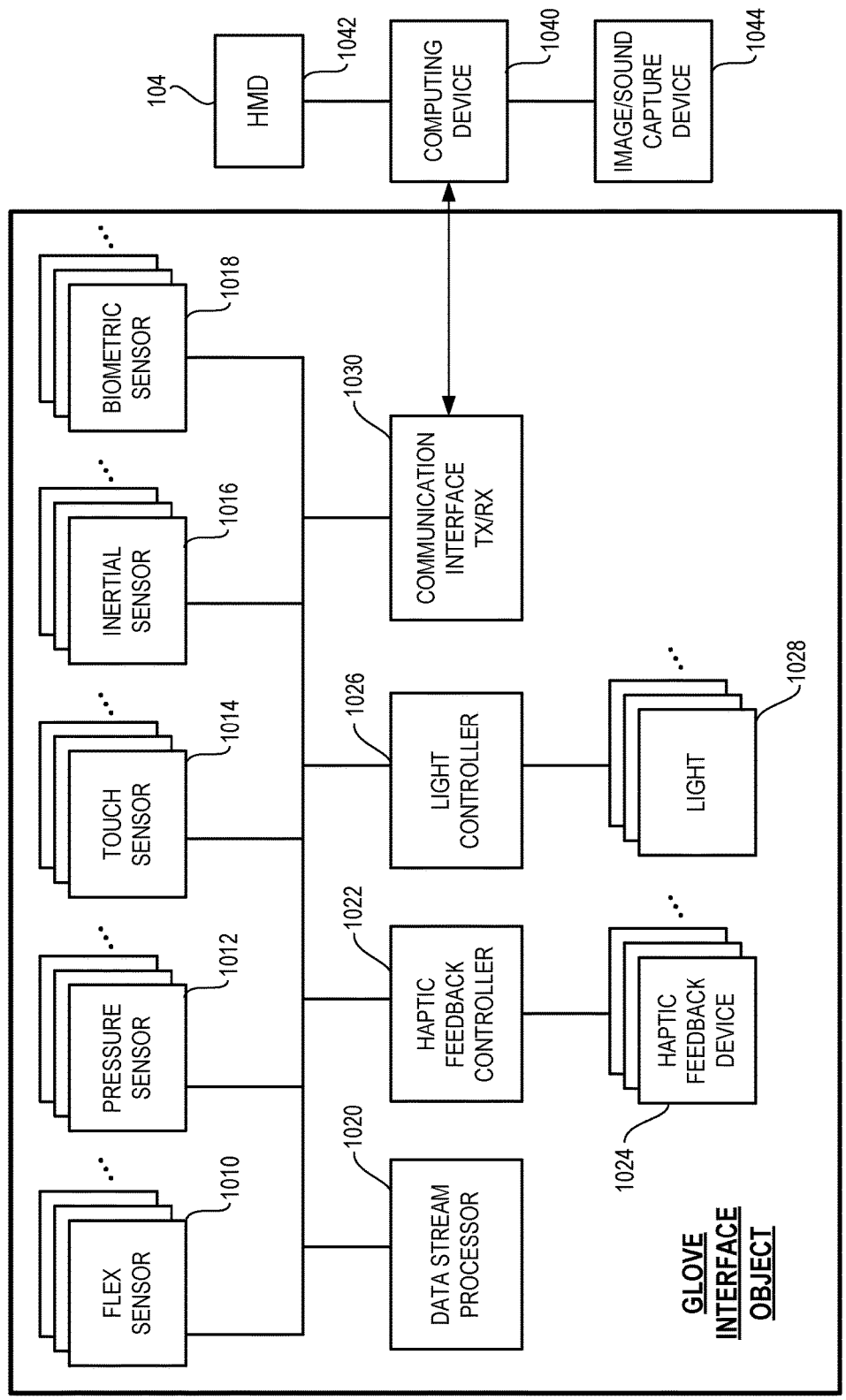
FIGS. 9A and 9B schematically illustrate a system for interfacing with an interactive application using a glove interface object, in accordance with an embodiment of the invention.

FIG. 9A schematically illustrates a system for interfacing with an interactive application using a glove interface object, in accordance with an embodiment of the invention. The glove interface object 104 includes flex sensors 1010, pressure sensors 1012, touch switches 1014, inertial sensors 1016, and biometric sensors 1018. A data stream processor 1020 is configured to process data from the various sensors. It will be appreciated that in various embodiments, the data stream processor 1020 may process sensor data to various extents, including determining values quantifying sensed activity, identifying poses, gestures, movements, etc. A haptic feedback controller 1022 is configured to control the operation of haptic feedback devices 1024. A light controller 1026 is configured to control the operation of lights 1028. A communications interface is configured to communicate data to/from other devices.

The haptic feedback devices 1024 can include the electromagnets which are configured to attract respective magnetic objects, as described in the present disclosure. The haptic feedback controller 1022 can be configured to receive data defining the activation/deactivation (on/off state) and the level/strength of activation of the electromagnets.

A computing device 1040 is configured to execute a video game, and communicate with the glove interface object 104. The video game is rendered on a display/HMD 1042. An image/sound capture device 1044 captures images and sound from the interactive environment in which the user is situated. It should be appreciated that the computing device 1040 receives data from the glove interface object such as sensor data, and the computing device may also generate commands to control the operation of the various devices of the glove interface object 104, to effect the functionality of the glove interface object discussed herein.

Figure 9B:
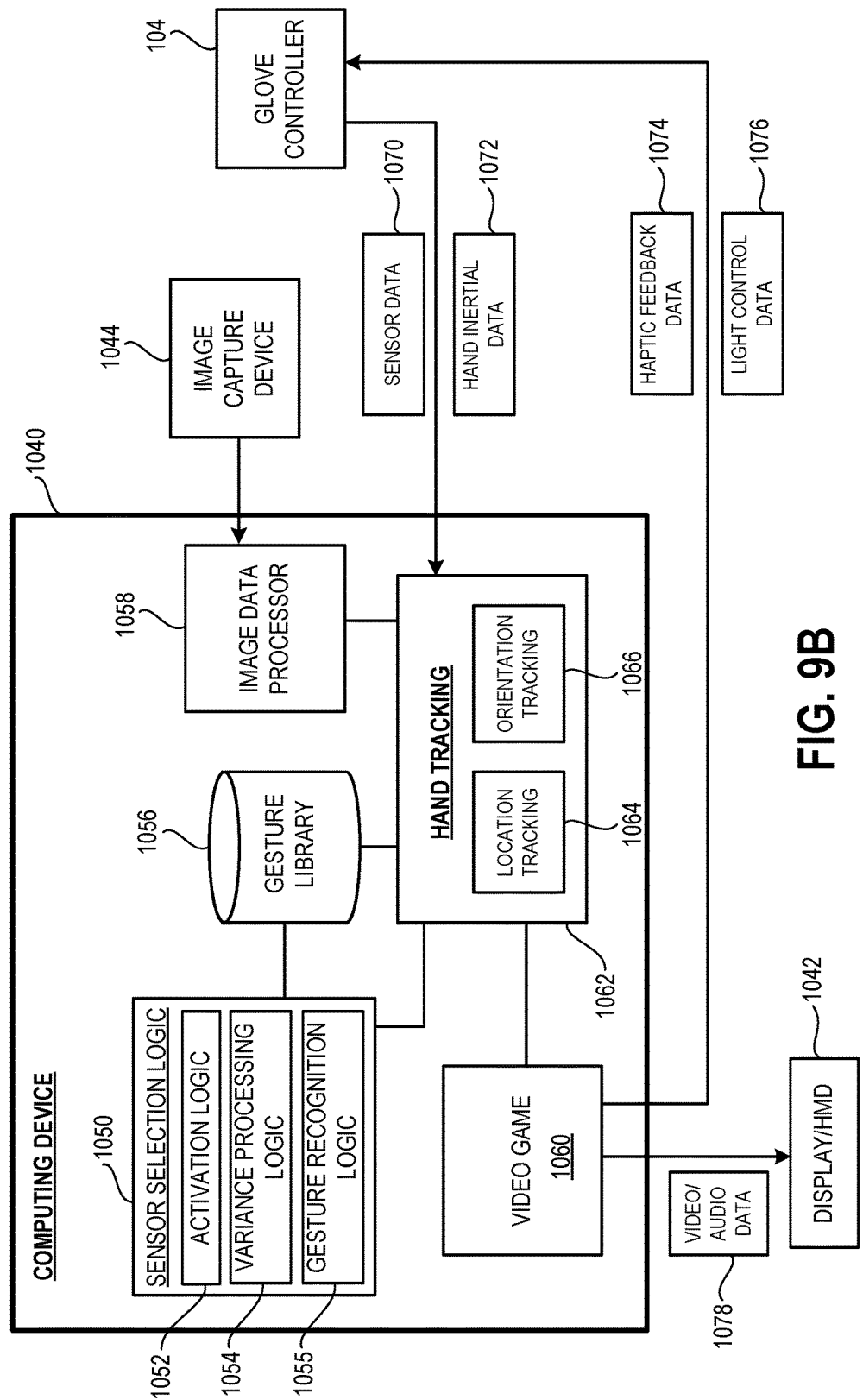

FIG. 9B illustrates additional components of the computing device 1040, in accordance with an embodiment of the invention. The glove interface object 104 provides sensor data 1070, detected/processed from the glove interface object's various sensors, to a sensor selection logic 1050. The sensor selection logic 1050 is configured to determine which sensors of the glove interface object 104 are optimally positioned for use during interactivity, in accordance with implementations described above. Activation logic 1052 is configured to control the activation of the various sensors for purposes of determining which sensors are optimally positioned. Variance processing logic 1054 is configured to determine the variances in sensor values between different hand positions such as open and closed hand positions, and further identify the sensors which exhibit the greatest variance (e.g. overall amongst all sensors of a given type or for a given predefined group of sensors). In some implementations, gesture recognition logic 1055 is provided for recognizing gestures for purposes of identifying optimally positioned sensors, as discussed above. A gesture library 1056 is provided, containing reference data defining various gestures, which may be utilized for sensor selection and calibration as described.

An image data processor 1058 processes images captured by the image capture device 1044, to identify trackable objects such as lights on the glove interface object 104. The hand tracking processor 1062 is configured to perform location tracking 1064 and orientation tracking 1066 of the hand of the user, based on the identified trackable objects as well as inertial data 1072 from the glove interface object 104. The location and orientation of the glove interface object (as defined by the user's hand) may also be provided as input to the video game 1060. The video game 1060 may generate haptic feedback data 1074 for transmission to the glove interface object 104, which thereby produces the haptic feedback. The video game 1076 may also generate light control data 1076 for controlling the lights on the glove interface object 104. Additionally, the video game 1060 generates video/audio data 1078 for rendering by the display/HMD 1042.

In some embodiments, the glove interface object is defined by an inner glove and an outer glove. The inner glove is removable and washable, whereas the outer glove contains the hardware for the glove interface object's functionality as described herein. Additionally, the inner glove may function as an insulator to insulate the hardware of the glove interface object from the user.

In some embodiments, haptic feedback can be provided by vibrating the fingertips at various frequencies to simulate textures as a user moves his fingers along a surface.

In some embodiments, force feedback mechanisms can be included in the glove interface object. Devices can be included which oppose motions of the user's hands/fingers, to simulate resistance encountered when making such motions. For example, a force feedback mechanism may oppose the motion of closing one's fingers, thus simulating the feel for grabbing/holding an object.

In some embodiments, pressure feedback mechanisms can be provided which apply pressure to at least a portion of the hand as a feedback mechanism. For example, a clamp may squeeze a finger as feedback, e.g. when touching a virtual object.

It should be appreciated that the input provided by the glove interface object can be applied to provide real-time control of a virtual hand or other object in a virtual environment. In some embodiments, the input provided by the glove interface object provides control of a non-hand-like object in the virtual environment, such as enabling manipulation of the object. In some embodiments, the input provided by the glove interface object provides real-time control of an arm or hand-like object of a character that is controlled by the user. When utilized in the context of presentation on an HMD device, the glove interface object can provide a highly immersive and intuitive experience with respect to control of an arm/hand or similar appendage of a character in the virtual environment. That is, the user can experience a sensation as if the virtual arm/hand or appendage really is their own arm/hand, resulting from the real-time control and responsiveness afforded by the glove interface object in combination with the highly immersive presentation of the HMD device.

Furthermore, it will be appreciated that within an interactive session of an interactive application, the virtual hand may be shown or not shown depending upon the execution state of the interactive application. For example, in a video game, there may be various stages/scenes/tasks/levels/etc. that may or may not require the virtual hand to be shown. Furthermore, the rendering of the virtual hand may be shown or not shown in the virtual environment depending upon the context or content of the virtual environment. For example, the virtual hand might be shown (or made available to be shown) when a specific object is present in the virtual scene, or when the user approaches the specific object to manipulate it or otherwise interact with it.

In some implementations, the pose and/or movement of the user's hand/fingers can define a gesture that can be identified from tracking the glove interface object in accordance with the principles discussed herein. The identified gesture can be configured to cause some action in the virtual environment—that is, the gesture is recognized and correlated to a produce a specific input for the interactive application that is generating the virtual environment. In various embodiments, a virtual hand may or may not be shown in conjunction with the gesture identification.

Figure 10:
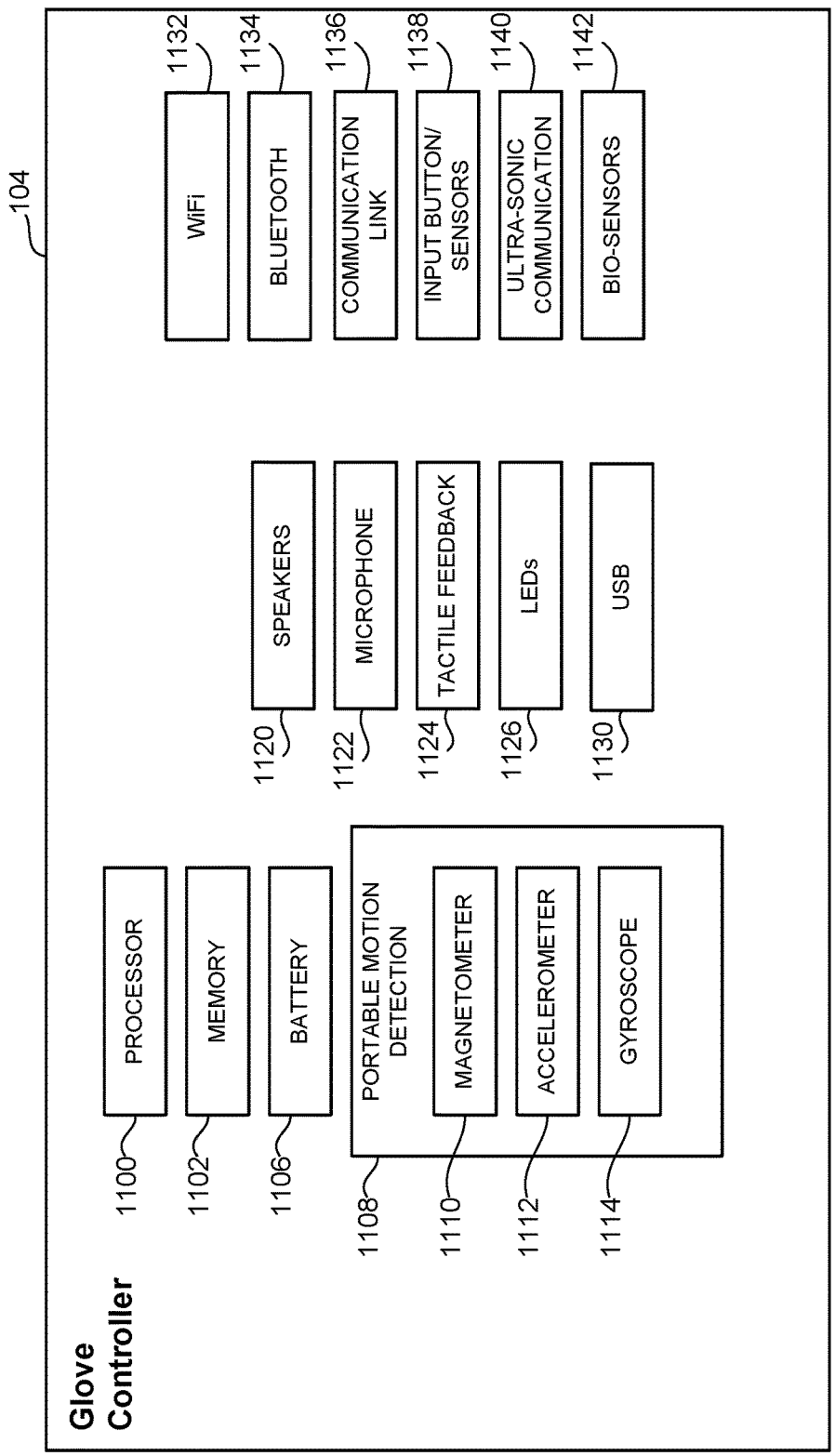
FIG. 10 illustrates components of a glove interface object, in accordance with an embodiment of the invention.

With reference to FIG. 10, a diagram illustrating components of a glove interface object 104 is shown, in accordance with an embodiment of the invention. The glove interface object 104 includes a processor 1100 for executing program instructions. A memory 1102 is provided for storage purposes, and may include both volatile and non-volatile memory. A battery 1106 is provided as a power source for the glove interface object 104. A motion detection module 1108 may include any of various kinds of motion sensitive hardware, such as a magnetometer 1110, an accelerometer 1112, and a gyroscope 1114.

The glove interface object 104 includes speakers 1120 for providing audio output. Also, a microphone 1122 may be included for capturing audio from the real environment, including sounds from the ambient environment, speech made by the user, etc. The glove interface object 104 includes tactile feedback module 1124 for providing tactile feedback to the user. In one embodiment, the tactile feedback module 1124 is capable of causing movement and/or vibration of the glove interface object 104 so as to provide tactile feedback to the user.

LEDs 1126 are provided as visual indicators of statuses of the glove interface object 104. For example, an LED may indicate battery level, power on, etc. A USB interface 1130 is included as one example of an interface for enabling connection of peripheral devices, or connection to other devices, such as other portable devices, computers, etc. In various embodiments of the glove interface object 104, any of various kinds of interfaces may be included to enable greater connectivity of the glove interface object 104.

A WiFi module 1132 is included for enabling connection to the Internet or a local area network via wireless networking technologies. Also, the glove interface object 104 includes a Bluetooth module 1134 for enabling wireless connection to other devices. A communications link 1136 may also be included for connection to other devices. In one embodiment, the communications link 1136 utilizes infrared transmission for wireless communication. In other embodiments, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-sonic communication module 1140 may be included in glove interface object 104 for facilitating communication with other devices via ultra-sonic technologies.

Bio-sensors 1142 are included to enable detection of physiological data from a user. In one embodiment, the bio-sensors 1142 include one or more dry electrodes for detecting bio-electric signals of the user through the user's skin.

The foregoing components of glove interface object 104 have been described as merely exemplary components that may be included in glove interface object 104. In various embodiments of the invention, the glove interface object 104 may or may not include some of the various aforementioned components. Embodiments of the glove interface object 104 may additionally include other components not presently described, but known in the art, for purposes of facilitating aspects of the present invention as herein described.

It will be appreciated by those skilled in the art that in various embodiments of the invention, the aforementioned glove interface object may be utilized in conjunction with an interactive application displayed on a display to provide various interactive functions. The exemplary embodiments described herein are provided by way of example only, and not by way of limitation.

Figure 11:
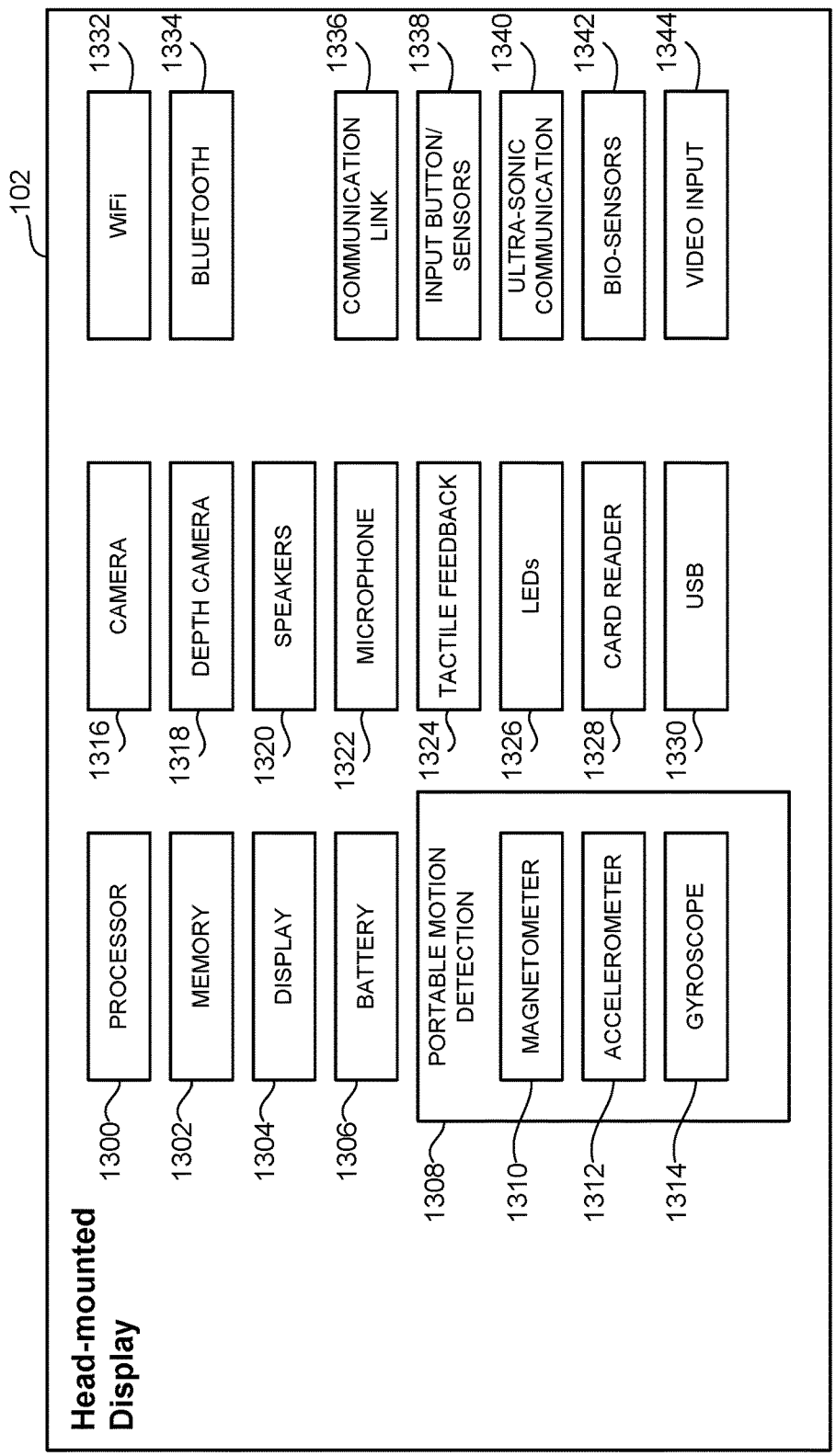
FIG. 11 illustrates components of a head-mounted display, in accordance with an embodiment of the invention.

With reference to FIG. 11, a diagram illustrating components of a head-mounted display 102 is shown, in accordance with an embodiment of the invention. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the present disclosure.

What is claimed is:

1. A glove for interfacing with a virtual reality scene presented via a head-mounted display (HMD), comprising:
    a plurality of digits associated with the glove, each digit configured to receive a finger of a user of the glove;
    wherein each digit having a plurality of sensor groups respectively positioned at predefined locations thereon, each sensor group having a plurality of flex sensors arranged in a parallel staggered configuration that is diagonal across an approximate fold line of the digit on which said sensor group is positioned, each flex sensor configured to identify a degree of flexion, wherein one of the plurality of flex sensors from each sensor group is selected as an optimal sensor for the respective predefined location at which the sensor group is positioned, wherein the optimal sensor for the respective predefined location exhibits a greatest degree of flexion amongst the flex sensors of the sensor group that are associated with the respective predefined location.

2. The glove for interfacing with a virtual reality scene of claim 1, wherein the predefined locations along the plurality of digits are configured to be respectively positioned approximately over a plurality of joints of the fingers of the user of the glove.

3. The glove for interfacing with a virtual reality scene of claim 2, wherein the plurality of joints include distal interphalangeal joints, proximal interphalangeal joints, or metacarpophalangeal joints of the fingers of the user of the glove.

4. The glove for interfacing with a virtual reality scene of claim 1, wherein the optimal sensors are activated for use during the interfacing with the virtual reality scene, and wherein the flex sensors that are not optimal sensors are deactivated during the interfacing with the virtual reality scene.

5. The glove for interfacing with a virtual reality scene of claim 4, further comprising:
a controller configured to control the activation or deactivation of the plurality of flex sensors and determine readings of the flex sensors when activated.

6. The glove for interfacing with a virtual reality scene of claim 5, wherein the controller is configured to receive control data from a computing device that determines when to activate or deactivate specific ones of the plurality of flex sensors and when to take readings of the flex sensors.

7. The glove for interfacing with a virtual reality scene of claim 5, wherein the controller is positioned at a wrist portion of the glove.

8. A method for determining optimal sensors on a glove for interfacing with a virtual reality scene presented via a head-mounted display (HMD), comprising:
establishing communication with the glove, the glove having a plurality of digits, each digit configured to receive a finger of a user of the glove, wherein each digit having a plurality of sensor groups respectively positioned at predefined locations thereon, each sensor group having a plurality of flex sensors arranged in a parallel staggered configuration that is diagonal across an approximate fold line of the digit on which said sensor group is positioned, each flex sensor configured to identify a degree of flexion, each predefined location having two or more of the flex sensors associated therewith;
obtaining first readings of each of the plurality of flex sensors of each sensor group;
obtaining second readings of each of the plurality of flex sensors of each sensor group;
for each sensor group, analyzing the first and second readings of each of the plurality of flex sensors of the sensor group to identify one of the plurality of flex sensors as an optimal sensor for the respective predefined location at which the sensor group is positioned, wherein analyzing the first and second readings of each of the plurality of flex sensors includes determining a difference between the first and second readings for each flex sensor, the optimal sensor for a given predefined location exhibiting a greatest difference amongst the flex sensors that are associated with the given predefined location;
activating the optimal sensor for each of the predefined locations for the interfacing with the virtual reality scene, wherein the ones of the plurality of flex sensors that are not identified as optimal sensors are not activated for the interfacing with the virtual reality scene.

9. The method of claim 8, wherein the predefined locations along the plurality of digits are configured to be respectively positioned approximately over a plurality of joints of the fingers of the user of the glove.

10. The method of claim 9, wherein the plurality of joints include distal interphalangeal joints, proximal interphalangeal joints, or metacarpophalangeal joints of the fingers of the user of the glove.

11. The method of claim 8, further comprising:
activating the optimal sensors for use during the interfacing with the virtual reality scene, wherein the flex sensors that are not optimal sensors are deactivated during the interfacing with the virtual reality scene.

12. The method of claim 8, further comprising:
before determining the first readings, rendering to the HMD a first message prompting the user to assume a first hand pose;
after determining the first readings and before determining the second readings, rendering to the HMD a second message prompting the user to assume a second hand pose.

13. The method of claim 12,
wherein the first hand pose is an open or neutral hand pose;
wherein the second hand pose is a closed or first hand pose.

14. The method of claim 8, wherein establishing communication with the glove includes communicating with a controller defined on the glove, the controller configured to control the activation of the plurality of flex sensors and determine readings of the flex sensors when activated.

15. The method of claim 14,
wherein obtaining the first and second readings of each of the plurality of flex sensors includes sending control data to the controller that determines when to activate specific ones of the plurality of flex sensors and when to take readings of the flex sensors, and receiving from the controller the first and second readings of each of the plurality of flex sensors.

* * * * *